US012735020B2

(12) United States Patent
Takahashi et al.

(10) Patent No.: US 12,735,020 B2
(45) Date of Patent: Sep. 15, 2026

(54) VEHICLE CONTROL DEVICE AND VEHICLE CONTROL METHOD

(71) Applicants: MITSUBISHI JIDOSHA KOGYO KABUSHIKI KAISHA, Tokyo (JP); The University of Tokyo, Tokyo (JP)

(72) Inventors: Ryota Takahashi, Tokyo (JP); Hiroshi Fujimoto, Tokyo (JP); Hiroyuki Fuse, Tokyo (JP); Guangzhi Yu, Tokyo (JP); Naoki Takahashi, Tokyo (JP); Yutaro Okamura, Tokyo (JP); Shunsuke Matsuo, Tokyo (JP); Ryosuke Koga, Tokyo (JP)

(73) Assignees: MITSUBISHI JIDOSHA KOGYO KABUSHIKI KAISHA, Tokyo (JP); THE UNIVERSITY OF TOKYO, Tokyo (JP)

( * ) Notice: Subject to any disclaimer, the term of this patent is extended or adjusted under 35 U.S.C. 154(b) by 87 days.

(21) Appl. No.: 18/881,771

(22) PCT Filed: Jul. 11, 2023

(86) PCT No.: PCT/JP2023/025520
§ 371 (c)(1),
(2) Date: Jan. 7, 2025

(87) PCT Pub. No.: WO2024/038707
PCT Pub. Date: Feb. 22, 2024

(65) Prior Publication Data

US 2026/0014973 A1 Jan. 15, 2026

(30) Foreign Application Priority Data

Aug. 16, 2022 (JP) ................................ 2022-129523

(51) Int. Cl.
*B60W 10/16* (2012.01)
*B60K 1/02* (2006.01)
(Continued)

(52) U.S. Cl.
CPC .............. *B60W 10/16* (2013.01); *B60K 1/02* (2013.01); *B60W 10/08* (2013.01);
(Continued)

(58) Field of Classification Search
CPC ................ B60W 10/16; B60W 10/08; B60W 30/18145; B60W 40/13; B60W 50/10;
(Continued)

(56) References Cited

U.S. PATENT DOCUMENTS

2022/0274598 A1* 9/2022 Miyamoto ............. B60L 15/20

FOREIGN PATENT DOCUMENTS

JP 2019-103249 A 6/2019

OTHER PUBLICATIONS

Knight, "Understanding Inertia Ratio and Its Effect On Machine Performance White Paper", Mitsubishielectric.com (Year: 2020).*
(Continued)

*Primary Examiner* — Hitesh Patel
*Assistant Examiner* — Shien Ming Chou
(74) *Attorney, Agent, or Firm* — Birch, Stewart, Kolasch & Birch, LLP

(57) ABSTRACT

The disclosed vehicle control device (10) controls outputs of a left driving source (2L) and a right driving source (2R) in a vehicle (1) provided with a left driving system including a left axle (4L) and a left wheel (5L) and a right driving system including a right axle (4R) and a right wheel (5R) and includes: a calculator (11) that calculates an equivalent sum value corresponding to a sum of a left requested torque and a right requested torque and an equivalent difference
(Continued)

value corresponding to a difference between the left requested torque and the right requested torque; a sum model that models motion states of the left driving system and the right driving system while the vehicle (1) is running straight, the equivalent sum value being applied to the sum model; a difference model that models motion states of the left driving system and the right driving system while the vehicle (1) is cornering, the equivalent difference value being applied to the difference model; and a controller (12) that controls the outputs, using a sum-mode instruction torque and a difference-mode instruction torque obtained by application to the sum model and the difference model, respectively.

10 Claims, 10 Drawing Sheets

(51) Int. Cl.

| | |
|---|---|
| ***B60W 10/08*** | (2006.01) |
| ***B60W 30/18*** | (2012.01) |
| ***B60W 40/13*** | (2012.01) |
| ***B60W 50/00*** | (2006.01) |
| ***B60W 50/10*** | (2012.01) |

(52) U.S. Cl.
CPC ...... *B60W 30/18145* (2013.01); *B60W 40/13* (2013.01); *B60W 50/10* (2013.01); *B60W 2040/1346* (2013.01); *B60W 2050/0025* (2013.01); *B60W 2050/0034* (2013.01); *B60W 2050/0039* (2013.01); *B60W 2050/0088* (2013.01); *B60W 2300/18* (2013.01); *B60W 2510/083* (2013.01); *B60W 2510/088* (2013.01); *B60W 2510/222* (2013.01); *B60W 2520/105* (2013.01); *B60W 2520/14* (2013.01); *B60W 2530/10* (2013.01)

(58) Field of Classification Search
CPC . B60W 2040/1346; B60W 2050/0025; B60W 2050/0034; B60W 2050/0039; B60W 2050/0088; B60W 2300/18; B60W 2510/083; B60W 2510/088; B60W 2510/222; B60W 2520/105; B60W 2520/14; B60W 2530/10; B60W 2050/0041; B60W 2710/083; B60W 2720/406; B60W 30/20; B60K 1/02; F16H 48/10; F16H 2048/106; B60L 15/2045; B60L 15/007; B60L 2220/42; B60L 2220/46; B60L 2240/20; B60L 2240/421; B60L 2240/423; B60L 2250/28; B60L 2270/145; Y02T 10/72
See application file for complete search history.

(56) References Cited

OTHER PUBLICATIONS

Li, "Estimation of Vehicle Dynamic Parameters Based on the Two-Stage Estimation Method", Sensors 2021, 21, 3711. MDPI (Year: 2021).*

International Preliminary Report on Patentability and Written Opinion of the International Searching Authority for International Application No. PCT/JP2023/025520, dated Feb. 27, 2025, with an English translation.

International Search Report (PCT/ISA/210) issued in PCT/JP2023/025520, dated Sep. 12, 2023.

Written Opinion (PCT/ISA/237) issued in PCT/JP2023/025520, dated Sep. 12, 2023.

* cited by examiner $J_{SM} = G^2 \cdot J_M$, $D_{SM} = G^2 \cdot D_M$ $J_{DM} = (2b+1)^2 \cdot G^2 \cdot J_M$, $D_{DM} = (2b+1)^2 \cdot G^2 \cdot D_M$

FIG. 7

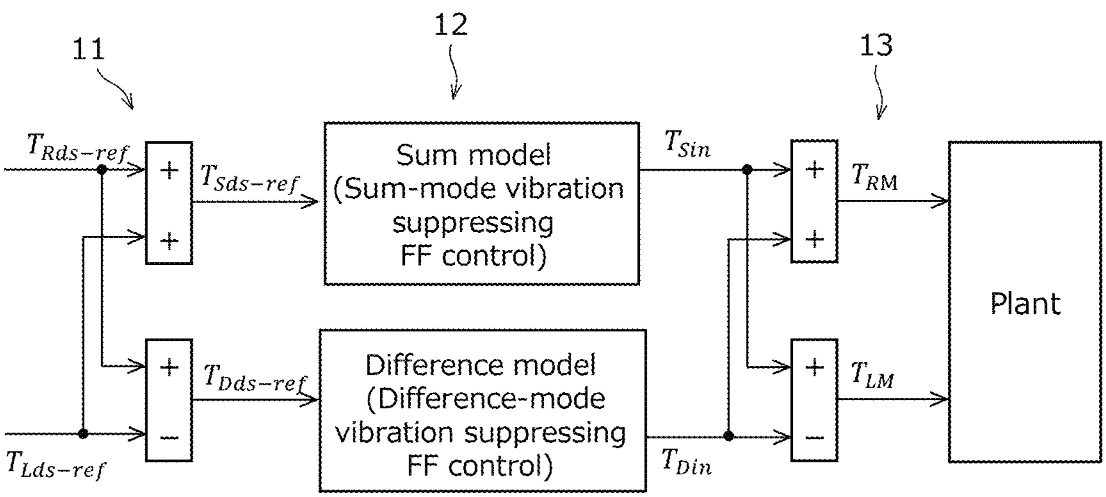

$T_{Rds-ref}$ : Right-axle requested torque (Right requested torque)

$T_{Lds-ref}$ : Left-axle requested torque (Left requested torque)

$T_{Sds-ref}$ : Sum-mode requested torque (Equivalent sum value)

$T_{Dds-ref}$ : Difference-mode requested torque (Equivalent difference value)

$T_{Sin}$ : Sum-mode instruction torque $T_{Din}$ : Difference-mode instruction torque $T_{RM}$ : Right-motor instruction torque $T_{LM}$ : Left-motor instruction torque

FIG. 10

| | Sum model | Difference model |
|---|---|---|
| Load inertia model $J_L$ | $J_w + r^2\boldsymbol{M}/2$ | $J_w + r^2\boldsymbol{I_z}/(2*(d/2)^2)$ |
| Motor inertia model $J_M$ | $J_m G^2$ | $J_m G^2(1+b_1+b_2)^2$ |
| Viscosity model $D_S$, $D_M$, $D_L$ | $D_M = D_m G^2$ | $D_M = D_m G^2(1+b_1+b_2)^2$ |
| Elasticity model $K_S$ | Common | |
| Assumed anti-resonance frequency fa=$\sqrt{(K_S/J_L)/(2\pi)}$ | Differentiate by $J_L$ | Differentiate by $J_L$ |
| Assumed anti-resonance frequency fr=$\sqrt{(K_S/J_M)/(2\pi)}$ | Differentiate by $J_M$ | Differentiate by $J_M$ |

VEHICLE CONTROL DEVICE AND VEHICLE CONTROL METHOD

TECHNICAL FIELD

The embodiment discussed herein relates to a vehicle control device and a vehicle control method that controls a driving source mounted on a vehicle.

BACKGROUND TECHNIQUE

Conventionally, for a vehicle provided with multiple driving sources, a method has been known in which an operating state of each driving source is controlled while suppressing vibration of a driving power transmission system by using a vehicle model that models the behavior of the driving power transmission system (see Patent Document 1).

PRIOR ART DOCUMENT

Patent Document

[Patent Document 1] JP 2019-103249 A

SUMMARY OF INVENTION

Problems to be Solved by Invention

The behavior (in particular, vibration) of the driving power transmission system while the vehicle is running straight is different from the behavior while the vehicle is cornering. For the above, there is need to construct a control to deal with a vehicle while running straight and a control to deal with the vehicle while cornering, which would result in a complex control configuration. In addition, the traveling state of a vehicle is sometimes a combined state in which a running-straight state (translational motion) and a cornering state (yaw motion) are mixed, which makes it difficult to enhance the controllability. For example, when control for suppressing the vibration of one of the left and right axles is performed, since the control (output) also affects the other axle, decoupling not to affect each other is required, which complicates the control configuration. This means that it is difficult to appropriately suppress vibrations having a different characteristic between a running-straight state and a cornering state at each of the left and right axles.

With the foregoing problems in view, one of the objects of the present disclosure is to provide a vehicle control device and a vehicle control method that can suppress vibrations on left and right axles with a simple configuration, avoiding interference with each other. In addition to this object, actions and effects which are derived from each configuration of "Embodiment to Carry out Invention" to be described below and which conventional technique does not attain are regarded as other objects of the present disclosure.

Means to Solve Problems of Invention

The disclosed vehicle control device and vehicle control method can be achieved in the embodiment and the application to be disclosed below and solve at least some of the above problems.

The disclosed vehicle control device controls outputs of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel. The disclosed vehicle control device includes: a calculator that calculates an equivalent sum value corresponding to a sum of a left requested torque being a requested torque to the left driving system or the left driving source and a right requested torque being a requested torque to the right driving system or the right driving source and calculates an equivalent difference value corresponding to a difference between the left requested torque and the right requested torque; a sum model that models motion states of the left driving system and the right driving system while the vehicle is running straight, the equivalent sum value being applied to the sum model; a difference model that models motion states of the left driving system and the right driving system while the vehicle is cornering, the equivalent difference value being applied to the difference model; and a controller that controls the outputs of the left driving source and the right driving source, using a sum-mode instruction torque obtained by applying the equivalent sum value to the sum model and a difference-mode instruction torque obtained by applying the equivalent difference value to the difference model.

The disclosed vehicle control method controls outputs of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel. The vehicle control method includes: preparing a sum model that models motion states of the left driving system and the right driving system while the vehicle is running straight and a difference model that models motion states of the left driving system and the right driving system while the vehicle is cornering in advance; calculating an equivalent sum value corresponding to a sum of a left requested torque being a requested torque to the left driving system or the left driving source and a right requested torque being a requested torque to the right driving system or the right driving source and calculating an equivalent difference value corresponding to a difference between the left requested torque and the right requested torque; obtaining a sum-mode instruction torque by applying the equivalent sum value to the sum model and a difference-mode instruction torque by applying the equivalent difference value to the difference model; and controlling the outputs of the left driving source and the right driving source, using the sum-mode instruction torque and the difference-mode instruction torque.

Effect of Invention

According to the disclosed vehicle control device and vehicle control method, vibrations of the left and right axles having a different vibration characteristic between a running-straight state and a cornering state can be suppressed without interfering with each other by controlling the left and right driving sources using the sum-mode instruction torque obtained by applying the equivalent sum value to the sum model and the difference-mode instruction torque obtained by applying the equivalent difference value to the difference model. Furthermore, since the disclosed device and method can eliminate the requirement for complex decoupling control, vibration suppression can be achieved with a simple configuration.

BRIEF DESCRIPTION OF DRAWINGS

FIG. 7 is a block diagram showing a logic of vibration suppressing control performed by the vehicle control device.

FIG. 8A shows left- and right-axle requested torques, FIG. 8B shows a sum-mode requested torque and a difference-mode requested torque, FIG. 8C shows a sum-mode instruction torque and a difference-mode instruction torque, and FIG. 8D shows left- and right-motor instruction torques.

FIG. 9A shows left- and right-axle requested torques, FIG. 9B shows a sum-mode requested torque and a difference-mode requested torque, FIG. 9C shows a sum-mode instruction torque and a difference-mode instruction torque, and FIG. 9D shows left- and right-motor instruction torques.

FIG. 10 is a table showing parameters decomposed for a sum mode and a difference mode by an equation of a transfer function derived as an example.

EMBODIMENT TO CARRY OUT INVENTION

Examples of the type of a vehicle that adopts a vehicle control device and a vehicle control method disclosed herein are an engine vehicle (a gasoline-powered vehicle, a diesel-powered vehicle), an electric vehicle, and a hybrid vehicle. The vehicle is an automobile that travels by driving left and right wheels (left and right driving wheels) using at least one driving source (e.g., an internal combustion engine or a motor), and is preferably an automobile that travels by driving left and right wheels (left and right drive wheels) using multiple driving sources. Here, one of the multiple driving sources is referred to as a left driving source, and another one of the driving sources is referred to as a right driving source. In addition, one of the left and right wheels positioned on the left side of the vehicle is referred to as a left wheel, and the other is referred to as a right wheel. The disclosed vehicle control device and vehicle control method can be used in controlling a vehicle provided with a left driving system including a left axle and a left wheel to which motion power from the left driving source is transmitted and a right driving system including a right axle and a right wheel to which motion power from the right driving source is transmitted.

The layout of each of the left driving source and the right driving source may or may not be set to correspond to the left-right direction determined based on the forward-traveling direction of the vehicle. The left driving system and the right driving system may operate independently of each other, or may be connected to each other via a transmission mechanism or a power distributing mechanism. The disclosed vehicle control device and vehicle control method can be used to control an in-wheel motor vehicle that drives the left and right wheels with respective different motors and also to control a torque vectoring vehicle in which the left and right wheels can transmit a driving force and a torque to each other.

EMBODIMENT

1. Configuration

Figure 1:
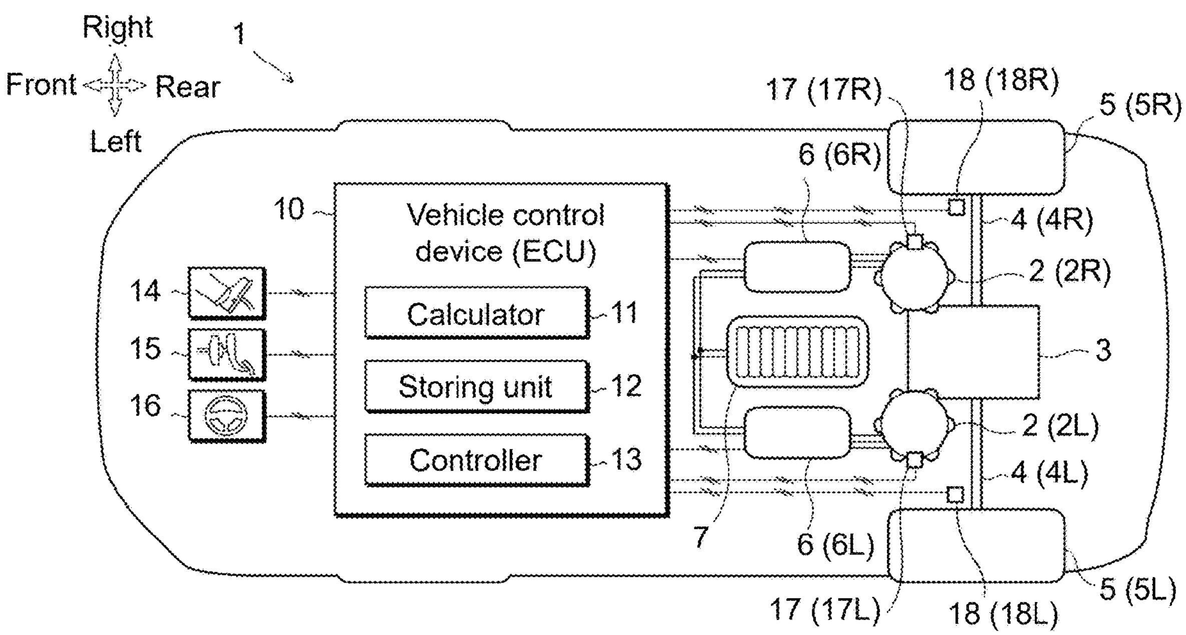
FIG. 1 is a block diagram showing a configuration of a vehicle control device and a vehicle.

A vehicle control device 10 according to an embodiment is mounted on a vehicle 1 shown in FIG. 1. The vehicle 1 includes left and right wheels 5 (wheels) aligned side by side in the vehicle width direction, a power distributing mechanism 3 (differential mechanism) that applies a torque difference to the left and right wheels 5, and a pair of motors 2 connected to the power distributing mechanism 3. In the drawings illustrating the embodiment, alphabets R and L which are attached to the numerical signs represent the arrangement positions of the elements related to the signs (i.e., the positions on the right side and the left side of the vehicle 1). For example, the reference sign 5L represents one (left wheel) of the left and right wheels 5 located on the left side of the vehicle 1, and the reference sign 5R represents the other (right wheel) located on the right side. The left and right wheels 5 may be positioned anywhere in the front-rear direction and may be front wheels or rear wheels of the vehicle 1.

Each motor 2 (driving source) has a function of driving at least either one of the front wheels and the rear wheels of the vehicle 1, and can have a function of driving all four wheels. Of the pair of motors 2, one arranged on the left side is a left motor 2L (left driving source), and the other arranged on the right side is a right motor 2R (right driving source). The left motor 2L and the right motor 2R operate independently of each other, and may individually output driving forces having different magnitudes from each other. These motors 2 are connected to the power distributing mechanism 3 each via a pair of reduction mechanisms provided separately from each other.

The vehicle 1 includes the power distributing mechanism 3 that amplifies the torque difference between the pair of motors 2 and distributes the torque difference to each of left and right wheels 5. The power distributing mechanism 3 of the present embodiment is a differential mechanism having a yaw control function (AYC (Active Yaw Control) function), and is interposed between an axle 4 (left axle 4L) connected to the left wheel 5L and an axle 4 (right axle 4R) connected to the right wheel 5R. The yaw control function is a function that adjusts the yaw moment by actively controlling the sharing ratio of the driving forces (driving torques) of the left and right wheels 5 and stabilizes the posture of the vehicle 1. Inside the power distributing mechanism 3, a planetary gear mechanism and a differential gear mechanism are incorporated, for example. A vehicle driving device including the pair of motors 2 and the power distributing mechanism 3 is also referred to as a DM-AYC (Dual Motor AYC) device.

Figure 2:
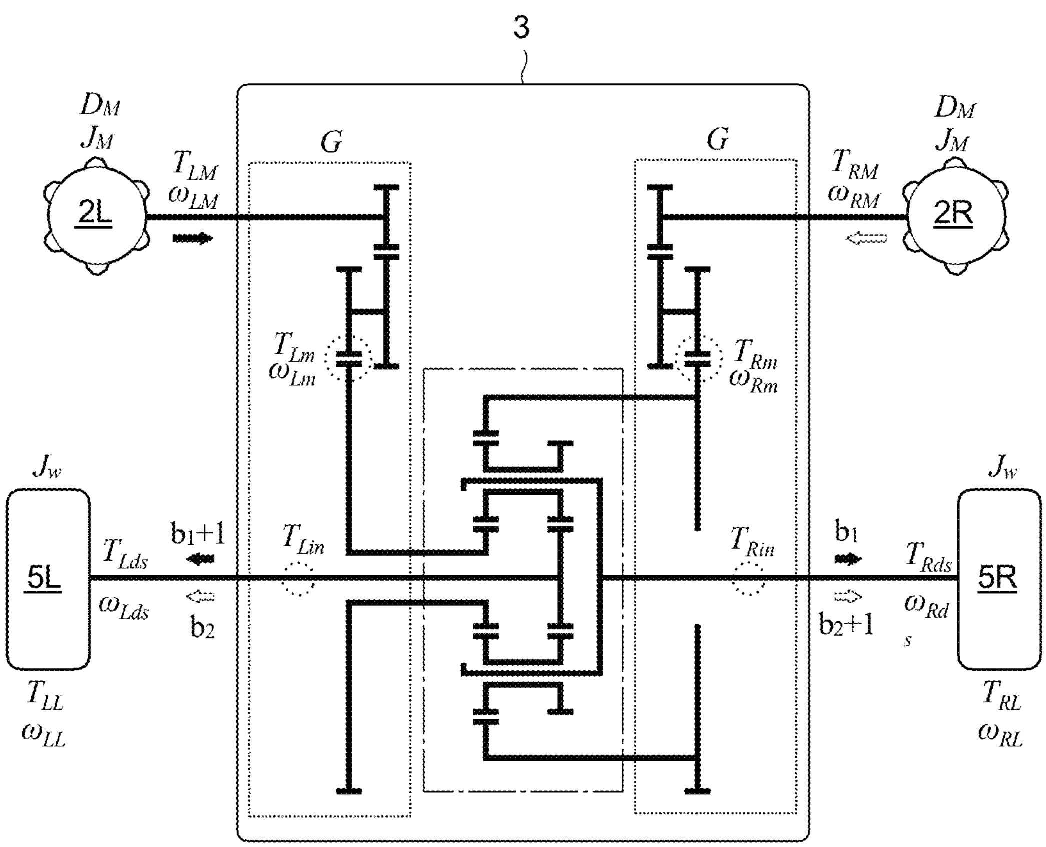
FIG. 2 is a skeleton diagram showing an example of a configuration of a driving system of the vehicle.

As shown in FIG. 2, the power distributing mechanism 3 includes the pair of reduction mechanisms (gear trains surrounded by dashed lines in FIG. 2) that reduces the rotational speeds of the motors 2 and a transmission mechanism (gear trains surrounded by one-dot dashed lines in FIG. 2). Each reduction mechanism is a mechanism that increases the torque by reducing the speed of the corresponding motor 2. The reduction ratio G of the reduction mechanism is appropriately set according to the output characteristic and the performance of the motor 2. If the torque performances of the motors 2 are sufficiently high, the reduction mechanisms may be omitted. The transmission mechanism is a mechanism that amplifies the difference between torques transmitted to the left and right wheels 5.

The transmission mechanism of the power distributing mechanism 3 shown in FIG. 2 includes a pair of planetary gear mechanisms. These planetary gear mechanisms have a structure in which the rotation shafts of planetary gears provided on respective carriers are connected to each other. Each carrier supports the planetary gears such that the planetary gears can rotate and revolve between a sun gear and a ring gear. Further, the driving forces transmitted from the left and right motors 2 are inputted into the ring gear and the sun gear of one of the planetary gear mechanisms. The driving forces transmitted to the left and right wheels 5 are taken out from the sun gear and the carrier of the other planetary gear mechanism. Note that the structure of the power distributing mechanism 3 shown in FIG. 2 is merely exemplary for achieving the yaw control function, and can be replaced with another known structure.

In FIG. 2, the symbol $J_M$ represents motor inertia (moment of inertia of the motors 2), the symbol $D_M$ represents a motor viscosity (viscosity of the motor 2), and the symbol $J_w$ represents wheel inertia (moment of inertia of the left and right wheels 5). Also, in relation to the parameters of a left driving system, the symbol $T_{LM}$ represents a left-motor input torque (left-motor instruction torque), the symbol $T_{Lm}$ represents a left-motor input torque reduced by the reduction mechanism, the symbol $\omega_{LM}$ represents a left-motor angular speed, the symbol $\omega_{Lm}$ represents a left-motor angular speed reduced by the reduction mechanism, the symbol $T_{Lin}$ represents a left driving-side torque, the symbol $T_{Lds}$ represents a left-axle torque, the symbol $T_{LL}$ represents a left-wheel load-side torque, the symbol $\omega_{Lds}$ represents a left driving-side angular speed, and the symbol $\omega_{LL}$ represents a left-wheel angular speed. Similarly, in relation to the parameters of a right driving system, the symbol $T_{RM}$ represents a right-motor input torque (right-motor instruction torque), the symbol $T_{Rm}$ represents a right-motor input torque reduced by the reduction mechanism, the symbol $\omega_{RM}$ represents a right-motor angular speed, the symbol $\omega_{Rm}$ represents a right-motor angular speed reduced by the reduction mechanism, the symbol $T_{Rin}$ represents a right driving-side torque, the symbol $T_{Rds}$ represents a right-axle torque, the symbol $T_{RL}$ represents a right-wheel load-side torque, the symbol $\omega_{Rds}$ represents a right driving-side angular speed, and the symbol $\omega_{RL}$ represents a right-wheel angular speed.

Figure 3:
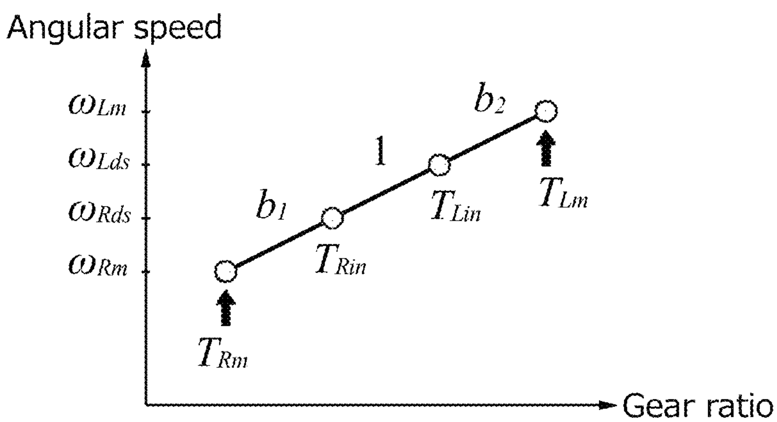
FIG. 3 is a speed graph of a power distributing mechanism of the vehicle having the configuration of FIG. 2.

FIG. 3 is a speed graph of the power distributing mechanism 3. The symbols $b_1$, $b_2$ shown in FIGS. 2 and 3 represent torque difference amplification ratios (reduction ratios, differential reduction ratios) determined according to the configuration of the gears incorporated in the power distributing mechanism 3. The torque difference amplification ratio related to motion power transmission from the left motor 2L to the right wheel 5R is represented by $b_1$ and the torque difference amplification ratio related to motion power transmission from the left motor 2L to the left wheel 5L is represented by $b_1+1$. In addition, the torque difference amplification ratio related to motion power transmission from the right motor 2R to the left wheel 5L is represented by $b_2$ and the torque difference amplification ratio related to motion power transmission from the right motor 2R to the right wheel 5R is represented by $b_2+1$.

As shown in FIG. 1, the pair of motors 2 are electrically connected to a battery 7 via respective inverters 6 (6L, 6R). Each inverter 6 is a converter (DC-AC inverter) that mutually converts the power (DC power) of a DC circuit on the side of the battery 7 and the power (AC power) of the AC circuits on the side of the motors 2. The battery 7 is, for example, a lithium-ion secondary battery or a nickel-metal hydride secondary battery, and is a secondary battery capable of supplying a high-voltage DC current of several hundred volts. While the motors 2 are power running, the DC power is converted into AC power by the inverters 6 and the converted AC power is then supplied to the motors 2. At the time of power generation of the motors 2, the generated electric power is converted into DC power by the inverters 6 and is charged into the battery 7. The operating status of each inverter 6 is controlled by the vehicle control device 10.

The vehicle control device 10 is one of electronic control units (ECUs) mounted on the vehicle 1. The vehicle control device 10 has a function of controlling outputs of the left motor 2L (left driving source) and the right motor 2R (right driving source) in the vehicle 1 provided with the left driving system including the left axle 4L and the left wheel 5L to which motion power from the left motor 2L is transmitted and the right driving system including the right axle 4R and the right wheel 5R to which motion power from the right motor 2R is transmitted.

The vehicle control device 10 includes a processor (central processing unit), a memory (main memory), a storage device (storage), an interface device, and the like, which do not appear in the drawings, and these elements are communicably coupled to each other via an internal bus. The contents of the determination and the control performed by the vehicle control device 10 are recorded and stored as firmware or an application program in the memory, and when the program is to be executed, the contents of the program are expanded in a memory space and executed by the processor.

To the vehicle control device 10, an accelerator position sensor 14, a brake sensor 15, a steering sensor 16, resolvers 17, and wheel speed sensors 18 are connected. The accelerator position sensor 14 is a sensor that detects the amount (accelerator opening) of depressing of the accelerator pedal and the depression speed. The brake sensor 15 is a sensor that detects the amount (brake pedal stroke) of depressing of the brake pedal and the depression speed. The steering sensor 16 is a sensor that detects a steering angle (actual steering angle or steering angle of the steering wheel) of the left and right wheels 5.

The resolvers 17 (17L, 17R) are sensors that detect the angular speeds of the motors 2 and are provided one for each of the pair of motors 2. Each resolver 17 outputs data of a rotational angle of the motor 2 in the form of a two-phase AC voltage. The angular speed of the motor 2 is grasped from the chronological change of the AC voltage. The wheel speed sensors 18 (18L, 18R) are sensors that detect the angular speeds of the axles 4. The vehicle control device 10 controls the operating status of the inverters 6 (6L, 6R) on the basis of the information detected by the above sensors 14 to 18 and thereby controls the outputs of the pair of motors 2 (2L, 2R). The resolvers 17 may be replaced by other sensors (e.g., hall sensors and encoders) different in internal structure and operation principle.

2. Vehicle Control Device

Figure 4:
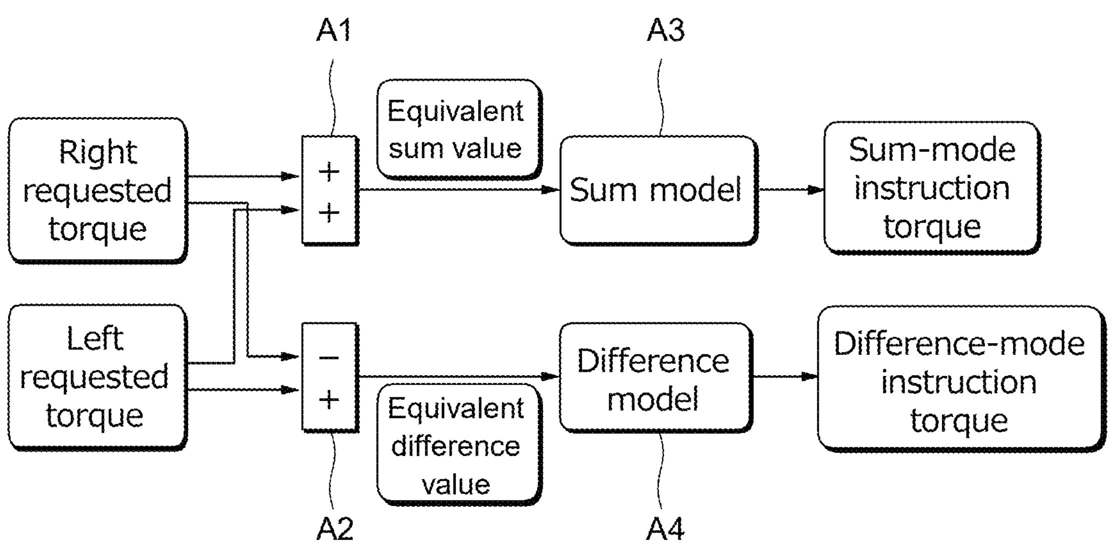
FIG. 4 is a block diagram showing a flow of a vehicle control method.

FIG. 4 is a schematic block diagram illustrating a basic concept (flow) of control performed by the vehicle control device 10 (output control on the motors 2 subjected to a vehicle control method according to the embodiment). In this control, vibrations of the left driving system and the right driving system are separated into a vibration while the vehicle 1 is running straight and a vibration while the vehicle 1 is cornering, and the former is isolated as a vibration of a sum mode and the latter is isolated as a vibration of a difference mode. Then, a torque for suppressing the vibration is obtained in each of the sum mode and the difference mode, and the obtained torques are returned to the left and right expressions, and then outputted (instructed) to the left motor 2L and the right motor 2R.

The storage device of the vehicle control device 10 stores a sum-mode vibration suppression model (hereinafter, also simply referred to as a "sum model") used in the sum mode and a difference-mode vibration suppression model (hereinafter, also simply referred to as a "difference model") used in the difference mode in advance. In other words, the present vehicle control method firstly prepares the sum model and the difference model. The sum model is a model that models motion states of the left driving system and the right driving system while the vehicle 1 is running straight, and the difference model is a model that models motion states of the left driving system and the right driving system while the vehicle 1 is cornering. The sum model and the difference model are models related to the vibration suppression.

Generally, the vehicle 1 generates different vibrations between a running-straight state and a cornering state, and the resonant frequencies in these states are also different from each other. As an example, although the resonant frequency varies depending on the type of the vehicle 1, the resonant frequency is about 6 Hz while the vehicle 1 is running straight, whereas the resonant frequency is smaller than this, for example, about 2 Hz while the vehicle 1 is cornering. As described above, in order to effectively suppress vibrations that are different depending on whether the traveling state of the vehicle 1 is the running-straight state (translational motion) or the cornering state (yaw motion) and to prevent the controls (outputs) for vibration suppression from interfering with each other on the left and right sides, the control (output) is separated into the above two modes and the models used one in each of the modes are provided. That is, for a resonant frequency which is different between the running-straight state and the cornering state, the sum model and the difference model are ones that activate vibration suppressing control under the respective running-straight and cornering states.

As shown in FIG. 4, the sum model is applied with an equivalent sum value to output (derive) a sum-mode instruction torque for suppressing vibrations of the left driving system and the right driving system while the vehicle 1 is running straight. Similarly, the difference model is applied with an equivalent difference value to output (derive) a difference-mode instruction torque for suppressing vibrations of the left driving system and the right driving system while the vehicle 1 is cornering. The equivalent sum value is a generic term for a value corresponding to the sum of a left requested torque and a right request torque. The left requested torque is a requested torque to the left driving system or the left motor 2L, and the right requested torque is a requested torque to the right driving system or the right motor 2R. The equivalent sum value may be not only a simple sum but also a product of the sum and a predetermined coefficient or the half the sum (arithmetic mean value). In addition, the equivalent difference value is a generic term for a value corresponding to the difference between the left requested torque and the right requested torque. The equivalent difference value may be not only a simple difference but also a product of the difference and a predetermined coefficient.

Step A1 in FIG. 4 corresponds to a step of calculating the equivalent sum value corresponding to the sum of the left requested torque and the right requested torque. The equivalent sum value calculated in this step is applied to the sum model in Step A3 in FIG. 4. As a result, an output (sum-mode instruction torque) for suppressing vibrations of the left driving system and the right driving system while the vehicle 1 is running straight is obtained, so that the vibration state of the vehicle 1 while running straight is effectively suppressed. Step A2 in FIG. 4 corresponds to a step of calculating the equivalent difference value corresponding to the difference between the left requested torque and the right requested torque. The equivalent difference value calculated in this step is applied to the difference model in Step A4 in FIG. 4. As a result, an output (difference-mode instruction torque) for suppressing vibrations of the left driving system and the right driving system while the vehicle 1 is cornering is obtained, so that the vibration state of the vehicle 1 while cornering is effectively suppressed.

Next, description will now be made in relation to a specific configuration to perform the above-described control. As shown in FIG. 1, the vehicle control device 10 includes a calculator 11, a storing unit 12, and a controller 13. These elements are obtained by classifying the functions of the vehicle control device 10 for convenience. These elements may be described as independent programs for implementing the functions of the respective elements. Alternatively, these elements may be described as a combined program of multiple elements being combined.

The calculator 11 calculates the equivalent sum value and the equivalent difference value. The calculator 11 of the present embodiment calculates the requested torque to the left driving system or the left motor 2L as the "left requested torque" and the requested torque to the right driving system or the right motor 2R as the "right requested torque" based on the driver operation (for example, the accelerator operation, the brake operation, the steering operation). Then, the calculator 11 calculates the equivalent sum value and the equivalent difference value based on the left requested torque and the counterpart right requested torque. Here, the left requested torque and the right requested torque may be calculated by calculating means different from the calculator 11, or may be calculated by an electronic control unit (for example, a superordinate ECU of the vehicle control device 10) different from the vehicle control device 10. The manner of calculating these requested torques is not particularly limited, and may be calculated based on, for example, vehicle speed information in addition to the above-described driver operation.

The left requested torque is, for example, a requested torque $T_{Lds\text{-}ref}$ (hereinafter, referred to as "left-axle requested torque $T_{Lds\text{-}ref}$") to the left axle 4L. The right requested torque is, for example, a requested torque $T_{Rds\text{-}ref}$ (hereinafter, referred to as "right-axle requested torque $T_{Rds\text{-}ref}$") to the right axle 4R. This embodiment illustrates a case where these axle requested torques $T_{Lds\text{-}ref}$ and $T_{Rds\text{-}ref}$ are used as the left requested torque and the right requested torque.

This embodiment illustrates a case where a sum-mode requested torque $T_{Sds\text{-}ref}$ is obtained as the equivalent sum value, and a difference-mode requested torque $T_{Dds\text{-}ref}$ is obtained as the equivalent difference value. The following calculation equations are used when the half of the sum of the left-axle requested torque $T_{Lds\text{-}ref}$ and the right-axle requested torque $T_{Rds\text{-}ref}$ is defined as the equivalent sum value and the half of the difference between the left-axle requested torque $T_{Lds\text{-}ref}$ and the right-axle requested torque $T_{Rds\text{-}ref}$ is defined as the equivalent difference value.

[Math 1]

$$\begin{pmatrix} T_{Sds-ref} \\ T_{Dds-ref} \end{pmatrix} = \begin{pmatrix} \frac{1}{2} & \frac{1}{2} \\ \frac{1}{2} & -\frac{1}{2} \end{pmatrix} \begin{pmatrix} T_{Rds-ref} \\ T_{Lds-ref} \end{pmatrix}$$

$$\begin{pmatrix} \omega_{SL-ref} \\ \omega_{DL-ref} \end{pmatrix} = \begin{pmatrix} \frac{1}{2} & \frac{1}{2} \\ \frac{1}{2} & -\frac{1}{2} \end{pmatrix} \begin{pmatrix} \omega_{RL-ref} \\ \omega_{LL-ref} \end{pmatrix}$$

The storing unit 12 stores a sum model, which models motion states of the left driving system and the right driving system while the vehicle 1 is running straight (model in particular related to vibration suppression), and a difference model, which models motion states of the left driving system and the right driving system while the vehicle 1 is cornering (model in particular related to vibration suppression). Before describing the sum model and the difference model, the schematic configurations of the left driving system and the right driving system of the vehicle 1 will now be described.

Figure 5:
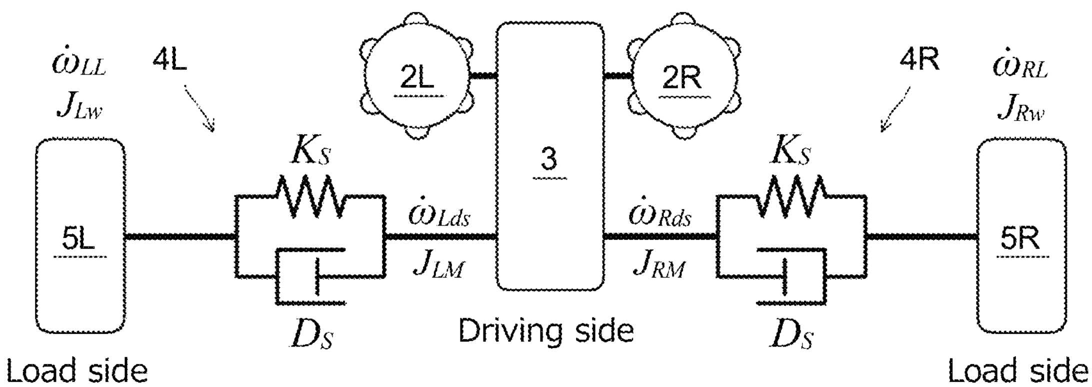
FIG. 5 is a schematic diagram schematically showing a left driving system and a right driving system of the vehicle.

FIG. 5 is a schematic diagram of the configurations of the left driving system and the right driving system of the vehicle 1. Each of the left axle 4L and the right axle 4R can be regarded as a structure in which a spring (axle stiffness $K_s$) and a damper (axle viscosity $D_s$) are connected in parallel. In FIG. 5, the symbol $J_{LM}$ represents inertia of the side of the power distributing mechanism 3 (driving side) against the left axle 4L, the symbol $J_{Lw}$ represents inertia of the side of the left wheel 5L (load side) against the left axle 4L, the symbol $J_{RM}$ represents inertia of the side of the power distributing mechanism 3 (driving side) against the right axle 4R, and the symbol $J_{Rw}$ is inertia of the side of the right wheel 5R (load side) against the right axle 4R. FIG. 5 also shows a differential value (left driving-side angular acceleration) of the left driving-side angular speed $\omega_{Lds}$, a differential value (left-wheel angular acceleration) of the left-wheel angular speed $\omega_{LL}$, a differential value (right driving-side angular acceleration) of the right driving-side angular speed $\omega_{Rds}$, and a differential value (right-wheel angular acceleration) of the right-wheel angular speed $\omega_{RL}$.

Figure 6A:
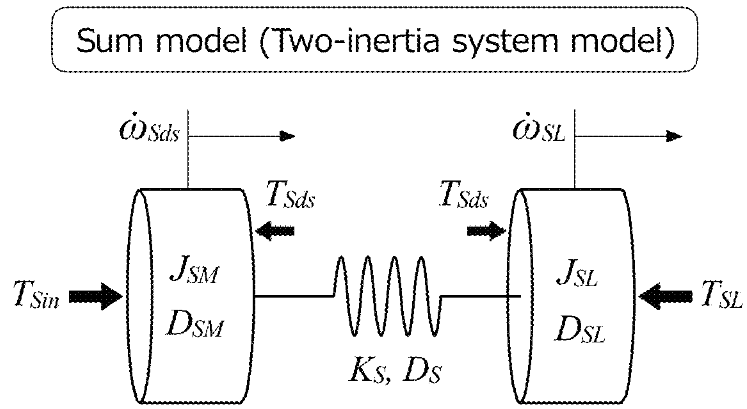
FIG. 6A is a schematic diagram of a sum model and FIG. 6B is a schematic diagram of a difference model.
Figure 6B:
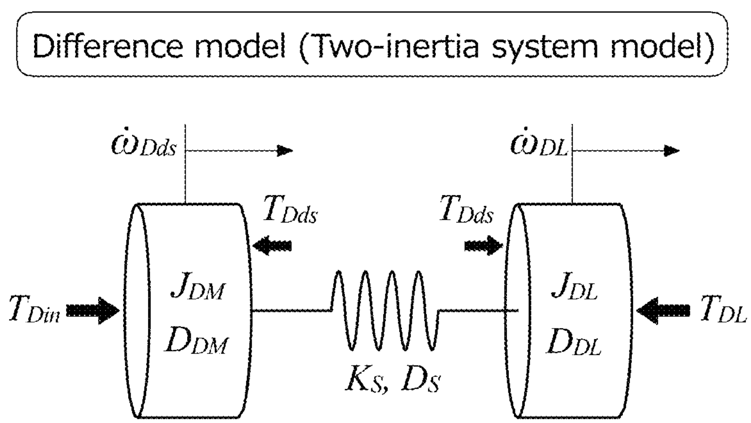

On the basis of the above schematic diagram, the configuration of the sum model is modeled to have the configuration shown in FIG. 6A, and the configuration of the difference model is modeled to have the configuration shown in FIG. 6B. The sum model is applied to vibration suppressing control on the axles 4 and the left and right wheels 5 related to the running-straight state of the vehicle 1, and the difference model is applied to vibration suppressing control on the axles 4 and the left and right wheels 5 related to the cornering state of the vehicle 1.

This embodiment gives the sum model a characteristic that is unlikely to generate the resonance during the running-straight state (a characteristic not containing a resonant frequency component during the running-straight state), and the difference model a characteristic that is unlikely to generate the resonance during the cornering state (a characteristic not containing a resonant frequency component during the cornering state). As the above, control with resonance frequencies different between the sum model and the difference model makes it possible to suppress vibrations in all driving states. In this embodiment, both the sum model and the difference model are two-inertia system models, but each may alternatively be configured as a multi-inertia system model including three or more moments of inertia and/or spring dampers.

As shown in FIG. 6A, the sum model includes driving-side inertia $J_{SM}$, a spring damper designed with a stiffness $K_s$ and a viscosity $D_s$, and load-side inertia (sum-mode wheel nominal inertia) $J_{SL}$. The driving-side inertia $J_{SM}$ is calculated based on the inertia $J_M$ of the driving sources (left driving source and right driving source), and is, for example, expressed by the equation $J_{SM}=G^2J_M$. The load-side inertia $J_{SL}$ is calculated based on a vehicle body weight M (calibrated in terms of a wheel).

In addition to the drive-side inertia $J_{SM}$ and the load-side inertia $J_{SL}$, the sum model may further consider a drive-side viscosity $D_{SM}$ and a load-side viscosity $D_{SL}$. The drive-side viscosity $D_{SM}$ is calculated on the basis of the viscosity $D_M$ of the driving sources (left driving source and right driving source), and is, for example, $D_{SM}=G^2D_M$. In FIG. 6A, the symbol $T_{Sin}$ represents a sum-mode driving-side torque, the symbol $T_{Sds}$ represents a sum-mode axle torque, the symbol Ts represents a sum-mode wheel load-side torque, the symbol $\omega_{Sds}$ represents a sum-mode driving-side angular speed, and the symbol $\omega_{SL}$ represents a sum-mode wheel angular speed. The sum model may be expressed by a relational expression including a transfer function representing the input/output characteristic of the two-inertia system. The equations of motion of the sum model are shown below.

Equation of motion of driving side

[Math 2]

$$J_{SM}\dot{\omega}_{Sds} = T_{Sin} - T_{Sds}$$

Equation of motion of load side $$J_{SL}\dot{\omega}_{SL} = T_{Sds} - T_{SL}$$

Equation of motion of spring dumper system $$T_{Sds} = K_S\int(\omega_{Sds} - \omega_{SL}) + D_S(\omega_{Sds} - \omega_{SL})$$

As shown in FIG. 6B, the difference model includes driving-side inertia $J_{DM}$ corresponding to equivalent inertia when a left-right difference is generated (i.e., while the vehicle 1 is cornering), the spring damper designed with the stiffness $K_s$ and the viscosity $D_s$, and load-side inertia (difference-mode wheel nominal inertia) $J_{DL}$. The driving-side inertia $J_{DM}$ is calculated based on the inertia $J_M$ of the driving sources (left driving source and right driving source) and the torque difference amplification ratios (e.g., $b_1$, $b_2$) of the power distributing mechanism 3, and is, for example, expressed by the equation $J_{DM}=(2b_1+1)^2G^2J_M$. The load-side inertia $J_{DL}$ is calculated based on the yaw inertia (calibrated in terms of a wheel) of the vehicle 1.

In addition to the drive-side inertia $J_{DM}$ and the load-side inertia $J_{DL}$, the difference model may further consider a drive-side viscosity $D_{DM}$ and a load-side viscosity $D_{DL}$. The drive-side viscosity $D_{DM}$ is calculated on the basis of the viscosity $D_M$ and torque difference amplification ratios (e.g., $b_1$, $b_2$) of the driving sources (left driving source and right driving source), and is, for example, $D_{DM}=(2b_1+1)^2G^2D_M$. In FIG. 6B, the symbol $T_{Din}$ represents a difference-mode driving-side torque, the symbol $T_{Dds}$ represents a difference-mode axle torque, the symbol $T_{DL}$ represents a difference-mode wheel load-side torque, the symbol $\omega_{Dds}$ represents a difference-mode driving-side angular speed, and the symbol $\omega_{DL}$ represents a difference-mode motor angular speed. The difference model may also be expressed by a relational expression including a transfer function representing the input/output characteristic of the two-inertia system. The equations of motion of the difference model are shown below.

Equation of motion of driving side $$J_{DM}\dot{\omega}_{Dds} = T_{Din} - T_{Dds} \quad \text{[Math 3]}$$

Equation of motion of load side $$J_{DL}\dot{\omega}_{DL} = T_{Dds} - T_{DL}$$

Equation of motion of spring dumper system $$T_{Dds} = K_S \int (\omega_{Dds} - \omega_{DL}) + D_S(\omega_{Dds} - \omega_{DL})$$

The controller 13 obtains the sum-mode instruction torque for suppressing vibrations of the left driving system and the right driving system while the vehicle 1 is running straight by applying the equivalent sum value calculated by the calculator 11 to the sum model stored in the storing unit 12. The same applies to the difference model, and the controller 13 obtains the difference-mode instruction torque for suppressing vibrations of the left driving system and the right driving system while the vehicle 1 is cornering by applying the equivalent difference value calculated by the calculator 11 to the difference model stored in the storing unit 12. Then the controller 13 controls the outputs of the left motor 2L and the right motor 2R, using the obtained sum-mode instruction torque and difference-mode instruction torque.

Specifically, the controller 13 calculates the left-motor instruction torque $T_{LM}$ and the right motor instruction torque $T_{RM}$ from the sum-mode instruction torque and the difference-mode instruction torque, and controls the left and right motors 2. Here, in coordination with the method for calculation in the calculator 11, the controller 13 outputs, as the left-motor instruction torque $T_{LM}$, the half of the value obtained by subtracting the difference-mode instruction torque from the sum-mode instruction torque, and outputs, as the right-motor instruction torque $T_{RM}$, the half of the sum of the sum-mode instruction torque and the difference-mode instruction torque.

FIG. 7 is a block diagram illustrating the logic of the vibration suppressing control implemented in the vehicle control device 10. The vibration suppressing control is a control for obtaining the sum-mode instruction torque and the difference-mode instruction torque based on the sum model and the difference model, and is a feed-forward control (open-loop control). Here, the sum-mode instruction torque is specifically exemplified by the sum-mode driving-side torque $T_{Sin}$ and the difference-mode instruction torque is specifically exemplified by the difference-mode driving-side torque $T_{Din}$. The plant in FIG. 7 represents an object (e.g., shafts and gears included in the motors 2 and the power distributing mechanism 3) located on the power transmission paths upstream of the respective axles 4.

As shown in FIG. 7, in the calculator 11, the sum-mode requested torque $T_{Sds\text{-}ref}$ (equivalent sum value) and the difference-mode requested torque $T_{Dds\text{-}ref}$ (equivalent difference value) calculated on the basis of the left- and right-axle requested torques $T_{Lds\text{-}ref}$ and $T_{Rds\text{-}ref}$ (left and right requested torque) are applied to the sum model and the difference model, and consequently, the sum-mode instruction torque $T_{Sin}$ and the difference-mode instruction torque $T_{Din}$ are obtained. The controller 13 calculates the respective torques to be outputted by the pair of motors 2 as the instruction torques $T_{LM}$ and $T_{RM}$ based on the sum-mode instruction torque $T_{Sin}$ and the difference-mode instruction torque $T_{Din}$, and drives the pair of inverters 6 so as to obtain the torques.

This makes the actual left- and right-axle torques to accurately follow the axle requested torques $T_{Lds\text{-}ref}$ and $T_{Rds\text{-}ref}$, and the controllability of the axle torques (driving torques) is enhanced, so that the vibration of the axles 4 (ultimately, the vibration of the vehicle 1) is effectively suppressed. Further, providing the sum model and the difference model independently of each other makes it easy to provide respective different characteristics to the sum-mode instruction torque $T_{Sin}$ and the difference-mode instruction torque $T_{Din}$. This will be detailed with reference to FIGS. 8 and 9.

FIG. 8 shows input/output images of the vibration suppressing control at the time of straight acceleration, and FIG. 9 shows input/output images of the vibration suppressing control at the time of steady cornering. Each of FIG. 8A and FIG. 9A represents graphs showing chronological changes of the left- and right-axle requested torques $T_{Lds\text{-}ref}$ and $T_{Rds\text{-}ref}$, each of FIG. 8B and FIG. 9B represents graphs showing chronological changes of the sum-mode requested torque $T_{Sds\text{-}ref}$ and the difference-mode requested torque $T_{Dds\text{-}ref}$, each of FIG. 8C and FIG. 9C represents graphs showing chronological changes of the sum-mode instruction torque $T_{Sin}$ and the difference-mode instruction torque $T_{Din}$, and each of FIG. 8D and FIG. 9D represents graphs showing chronological changes of the left- and right-motor instruction torques $T_{LM}$ and $T_{Rm}$.

Figure 8A:
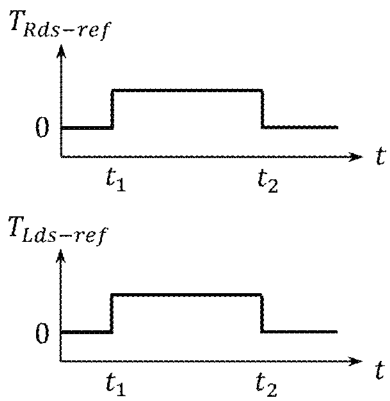
FIGS. 8A-8D are diagrams showing input/output images of the vibration suppressing control during straight acceleration.
Figure 8B:
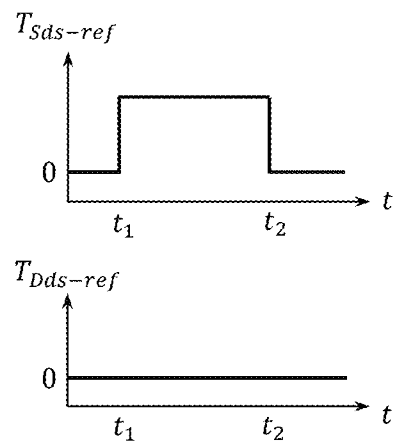

As shown in FIG. 8A, while the vehicle 1 is in the running-straight state, if the accelerator pedal is depressed at a certain time point $t_1$ and the accelerator pedal is returned at a subsequent time point $t_2$, the left- and right-axle requested torques $T_{Lds\text{-}ref}$ and $T_{Rds\text{-}ref}$ rise at the time point $t_1$ and then fall at the time point $t_2$. As shown in FIG. 8B, the sum-mode requested torque $T_{Sds\text{-}ref}$ is the sum of the two axle requested torques $T_{Lds\text{-}ref}$ and $T_{Rds\text{-}ref}$, and the difference-mode requested torque $T_{Dds}$-ref is the difference (i.e., 0) between the two axle requested torques $T_{Lds\text{-}ref}$ and $T_{Rds\text{-}ref}$.

Figure 8C:
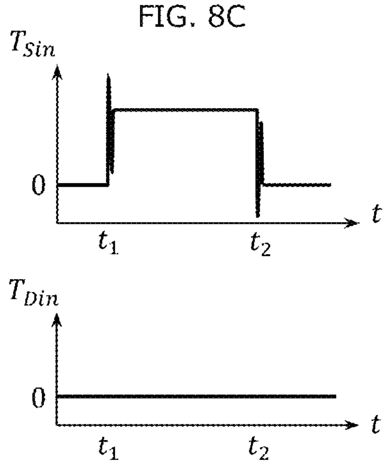
Figure 8D:
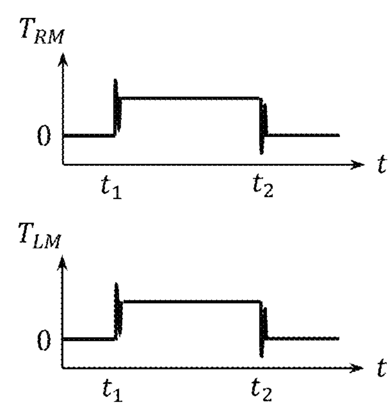

If the sum-mode requested torque $T_{Sds\text{-}ref}$ and the difference-mode requested torque $T_{Dds\text{-}ref}$ are applied to the sum model and the difference model, respectively, the sum-mode instruction torque $T_{Sin}$ largely changes at the rising time point $t_1$ and at the falling time point $t_2$, and the difference-mode instruction torque $T_{Din}$ remains at 0, as shown in FIG. 8C. Then, as shown in FIG. 8D, the left- and right-motor instruction torques $T_{LM}$ and $T_{RM}$, which are converted from the sum-mode instruction torque $T_{Sin}$ and the difference-mode instruction torque $T_{Din}$, largely change at the time point $t_1$ and the time point $t_2$.

As the above, by daring to change the motor instruction torques $T_{LM}$ and $T_{RM}$ at the rising time point $t_1$ and the falling time point $t_2$ of the left- and right-axle requested torques $T_{Lds\text{-}ref}$ and $T_{Rds\text{-}ref}$, the actual axle torques after actually passing through the plant is prevented from vibrating, so that the vibration while the vehicle 1 is running straight is suppressed.

Figure 9A:
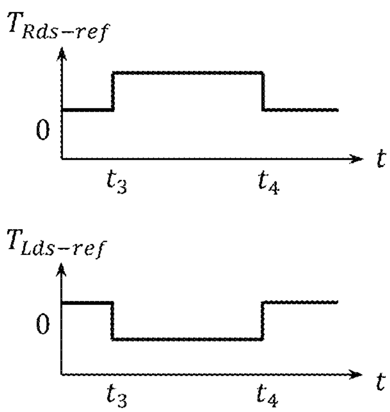
FIGS. 9A-9D are diagrams showing input/output images of the vibration suppressing control during steady cornering.
Figure 9B:
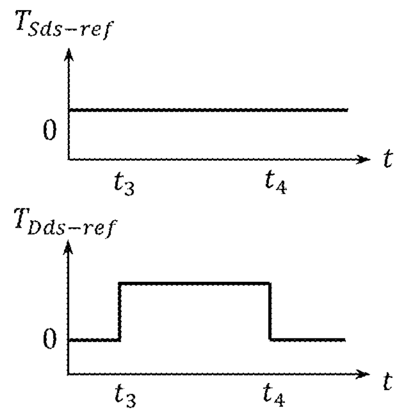

As shown in FIG. 9A, if the vehicle 1 starts steady cornering at a certain time point $t_3$ and then the cornering ends at the subsequent time point $t_4$, the left- and right-axle requested torques $T_{Lds\text{-}ref}$ and $T_{Rds\text{-}ref}$ rise at the time point $t_3$ and then fall at the time point $t_4$. As shown in FIG. 9B, the sum-mode requested torque $T_{Sds\text{-}ref}$ is the sum of the two axle requested torques $T_{Lds\text{-}ref}$ and $T_{Rds\text{-}ref}$, and the difference-mode requested torque $T_{Dds\text{-}ref}$ is the difference between the two axle requested torques $T_{Lds\text{-}ref}$ and $T_{Rds\text{-}ref}$.

Figure 9C:
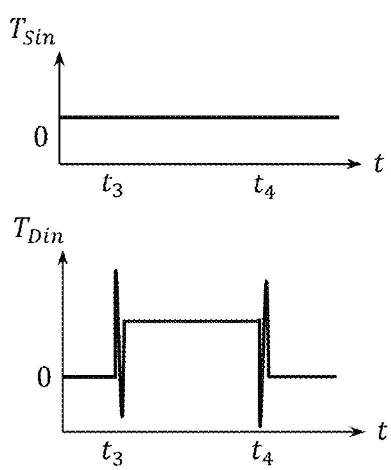
Figure 9D:
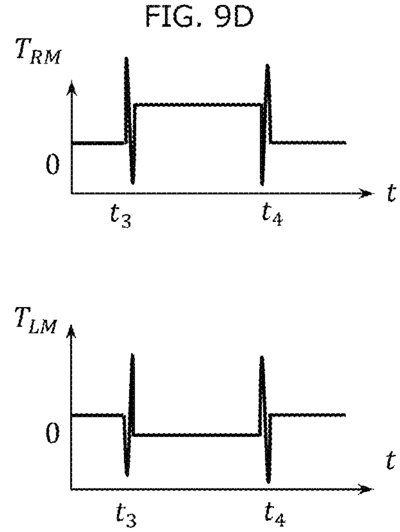

If the sum-mode requested torque $T_{Sds\text{-}ref}$ and the difference-mode requested torque $T_{Dds\text{-}ref}$ are applied to the sum model and the difference model, respectively, the sum-mode instruction torque $T_{Sin}$ does not particularly change, and the difference-mode instruction torque $T_{Din}$ largely changes at the rising time point $t_3$ and at the falling time point $t_4$ as shown in FIG. 9C. Then, as shown in FIG. 9D, the left and right motor instruction torques $T_{LM}$ and $T_{RM}$, which are converted from the sum-mode instruction torque $T_{Sin}$ and the difference-mode instruction torque $T_{Din}$, largely change at the time point $t_3$ and the time point $t_4$ As described above, also while the vehicle 1 is cornering, by daring to change the motor instruction torques $T_{LM}$ and $T_{RM}$ at the rising time point $t_3$ and the falling point $t_4$ of the left- and right-axle requested torques $T_{Lds\text{-}ref}$ and $T_{Rds\text{-}ref}$, the actual axle torques after actually passing through the plant is prevented from vibrating, so that the vibration while the vehicle 1 is cornering is suppressed.

The sum model of the present embodiment includes a transfer function expressed by a ratio of the sum-mode driving-side torque $T_{Sin}$ used for vibration suppressing control of the motors 2 to the equivalent sum value. Similarly, the difference model of the present embodiment includes a transfer function expressed by a ratio of the difference-mode driving-side torque $T_{Din}$ used for vibration suppressing control of the motors 2 to the equivalent difference value. Such transfer functions make it possible to calculate instruction torques that achieve requested outputs before reaching the axles 4 through the plant, without using sensor values of the resolvers 17 and the wheel speed sensors 18. Namely, the calculation is performed in a "feed-forward" manner. Hereinafter, description will now be made in relation to an example of the transfer function of the sum model and the difference model that can be set in the vehicle 1 provided with the power distributing mechanism 3.

3. Specific Examples of Sum Model and Difference Model

In deriving the above sum model and difference model, the power distributing mechanism 3 may formulate the models as follows by using vector expressions.

Matrixes of respective gear ratios

[Math 4]

$$G=\begin{pmatrix} G & 0 \\ 0 & G \end{pmatrix},\ B=\begin{pmatrix} b_2+1 & -b_2 \\ -b_1 & b_1+1 \end{pmatrix}$$

Angular speed vectors $$\omega_L=\begin{pmatrix} \omega_{RL} \\ \omega_{LL} \end{pmatrix},\ \omega_{ds}=\begin{pmatrix} \omega_{Rds} \\ \omega_{Lds} \end{pmatrix},\ \omega_M=GB\omega_{ds}=\begin{pmatrix} \omega_{RM} \\ \omega_{LM} \end{pmatrix}$$

Torque vectors $$T_{ds}=\begin{pmatrix} T_{Rds} \\ T_{Lds} \end{pmatrix},\ T_M=\begin{pmatrix} T_{RM} \\ T_{LM} \end{pmatrix},\ T_L=\begin{pmatrix} T_{RL} \\ T_{LL} \end{pmatrix},\ T_{in}=B^TGT_M=\begin{pmatrix} T_{Rin} \\ T_{lin} \end{pmatrix}$$

Dynamics of left and right wheels 5 (load side), driving side, and axles 4

$$P_L=\begin{pmatrix} \frac{1}{J_{SL}s+D_{SL}} & 0 \\ 0 & \frac{1}{J_{DL}s+D_{DL}} \end{pmatrix},\ P_M=\begin{pmatrix} \frac{1}{J_Ms+D_M} & 0 \\ 0 & \frac{1}{J_Ms+D_M} \end{pmatrix}$$

$$P_{DS}=\begin{pmatrix} D_s+\frac{K_s}{s} & 0 \\ 0 & D_s+\frac{K_s}{s} \end{pmatrix}$$

Establishing the equation of motion (sum and difference) on the driving side for each of the left and right sides using the above equations obtains the following result. In the equations, the symbol $Z_{11}$ represents the reduction ratio from the left driving source (left motor 2L) to the left shaft (left axle 4L), the symbol $Z_{22}$ represents the reduction ratio from the right driving source (right motor 2R) to the right shaft (right axle 4R), and the symbol $Z_c$ represents the reduction ratio from the left and right driving sources to the respective opposing shafts.

[Math 5]

$$\begin{pmatrix} \omega_{Rds} \\ \omega_{Lds} \end{pmatrix}=\frac{G^{-2}P_M}{|Z|}\begin{pmatrix} Z_{22} & -Z_c \\ -Z_c & Z_{11} \end{pmatrix}\begin{pmatrix} T_{Rin}-T_{Rds} \\ T_{Lin}-T_{Lds} \end{pmatrix}=$$

$$Z^{-1}=B^{-1^T}B^{-1}=\frac{1}{|Z|}\begin{pmatrix} Z_{22} & -Z_c \\ -Z_c & Z_{11} \end{pmatrix}=$$

$$\frac{1}{(1+b_1+b_2)^2}\begin{pmatrix} b_1^2+2b_1+b_2^2+1 & b_1^2+b_1+b_2^2+b_2 \\ b_1^2+b_1+b_2^2+b_2 & b_2^2+2b_2+b_1^2+1 \end{pmatrix}$$

$$Z_{11}=b_2^2+2b_2+b_1^2+1$$

$$Z_{22}=b_1^2+2b_1+b_2^2+1$$

$$Z_c=-(b_1^2+b_1+b_2^2+b_2)$$

Applying a matrix for conversion to the sum and difference modes to both sides of each of the above equations obtains the following equation.

[Math 6]

$$\begin{pmatrix} \frac{1}{2} & \frac{1}{2} \\ \frac{1}{2} & -\frac{1}{2} \end{pmatrix}\begin{pmatrix} \omega_{Rds} \\ \omega_{Lds} \end{pmatrix}=$$

$$\frac{G^{-2}P_M}{|Z|}\begin{pmatrix} \frac{1}{2} & \frac{1}{2} \\ \frac{1}{2} & -\frac{1}{2} \end{pmatrix}\begin{pmatrix} Z_{22} & -Z_c \\ -Z_c & Z_{11} \end{pmatrix}\begin{pmatrix} T_{Rin}-T_{Rds} \\ T_{Lin}-T_{Lds} \end{pmatrix}=$$

$$\frac{G^{-2}P_M}{2|Z|}\begin{pmatrix} Z_{22}-Z_c & Z_{11}-Z_c \\ Z_{22}+Z_c & -(Z_{11}+Z_c) \end{pmatrix}\begin{pmatrix} T_{Rin}-T_{Rds} \\ T_{Lin}-T_{Lds} \end{pmatrix}$$

Here, assuming $b_1=b_2=b$, the equations $Z_{11}-Z_c=Z_{22}-Z_c=|Z|$ and $Z_{11}+Z_c=Z_{22}+Z_c=1$ hold. Therefore, the equations can be modified as follows and the equation of motion of the motors 2 that can deal with the sum and difference modes can be obtained. By dividing the equation of motion of the driving side into the equation of the sum mode and that of the difference mode, the two equations do not interfere with each other.

[Math 7]

$$\begin{pmatrix} \frac{1}{2} & \frac{1}{2} \\ \frac{1}{2} & -\frac{1}{2} \end{pmatrix}\begin{pmatrix} \omega_{Rds} \\ \omega_{Lds} \end{pmatrix}=\frac{G^{-2}P_M}{2|Z|}\begin{pmatrix} |Z| & |Z| \\ 1 & -1 \end{pmatrix}\begin{pmatrix} T_{Rin}-T_{Rds} \\ T_{Lin}-T_{Lds} \end{pmatrix}=$$

$$\frac{P_M}{G^2}\begin{pmatrix} 1 & 0 \\ 0 & \frac{1}{|Z|} \end{pmatrix}\begin{pmatrix} \frac{1}{2} & \frac{1}{2} \\ \frac{1}{2} & -\frac{1}{2} \end{pmatrix}\begin{pmatrix} T_{Rin}-T_{Rds} \\ T_{Lin}-T_{Lds} \end{pmatrix}$$

Equation of motion of driving side $$\begin{pmatrix} \omega_{Sds} \\ \omega_{Dds} \end{pmatrix}=\frac{P_M}{G^2}\begin{pmatrix} 1 & 0 \\ 0 & \frac{1}{|Z|} \end{pmatrix}\begin{pmatrix} T_{Sin}-T_{Sds} \\ T_{Din}-T_{Dds} \end{pmatrix}$$

Likewise the derivation of the equation of motion of the driving side, the equations of motion of the left and right wheels 5 (load side) and the axles 4 may be formulated as follows.

Equation of motion of left and right wheels 5 (load side)

[Math 8]

$$\begin{pmatrix}\omega_{RL}\\ \omega_{LL}\end{pmatrix}=P_L\begin{pmatrix}T_{Rds}-T_{RL}\\ T_{Lds}-T_{LL}\end{pmatrix}$$

$$\begin{pmatrix}\frac{1}{2}&\frac{1}{2}\\ \frac{1}{2}&-\frac{1}{2}\end{pmatrix}\begin{pmatrix}\omega_{RL}\\ \omega_{LL}\end{pmatrix}=P_L\begin{pmatrix}\frac{1}{2}&\frac{1}{2}\\ \frac{1}{2}&-\frac{1}{2}\end{pmatrix}\begin{pmatrix}T_{Rds}-T_{RL}\\ T_{Lds}-T_{LL}\end{pmatrix}$$

$$\begin{pmatrix}\omega_{SL}\\ \omega_{DL}\end{pmatrix}=P_L\begin{pmatrix}T_{Sds}-T_{SL}\\ T_{Dds}-T_{DL}\end{pmatrix}$$

Equation of motion of axles 4

$$\begin{pmatrix}T_{Rds}\\ T_{Lds}\end{pmatrix}=P_{DS}\begin{pmatrix}\omega_{Rds}-\omega_{RL}\\ \omega_{Lds}-\omega_{LL}\end{pmatrix}$$

$$\begin{pmatrix}\frac{1}{2}&\frac{1}{2}\\ \frac{1}{2}&-\frac{1}{2}\end{pmatrix}\begin{pmatrix}T_{Rds}\\ T_{Lds}\end{pmatrix}=P_{DS}\begin{pmatrix}\frac{1}{2}&\frac{1}{2}\\ \frac{1}{2}&-\frac{1}{2}\end{pmatrix}\begin{pmatrix}\omega_{Rds}-\omega_{RL}\\ \omega_{Lds}-\omega_{LL}\end{pmatrix}$$

$$\begin{pmatrix}T_{Sds}\\ T_{Dds}\end{pmatrix}=P_{DS}\begin{pmatrix}\omega_{Sds}-\omega_{SL}\\ \omega_{Dds}-\omega_{DL}\end{pmatrix}$$

Here, since the dynamics of the left and right wheels 5 (load side) is represented by PL of the above Math 4, the equation of motion of the left and right wheels 5 (load side) of the above Math 8 is rewritten as follows.

[Math 9]

$$\begin{pmatrix}\omega_{SL}\\ \omega_{DL}\end{pmatrix}=P_L\begin{pmatrix}T_{Sds}-T_{SL}\\ T_{Dds}-T_{DL}\end{pmatrix}=\begin{pmatrix}\frac{1}{J_{SL}s+D_{SL}}&0\\ 0&\frac{1}{J_{DL}s+D_{DL}}\end{pmatrix}\begin{pmatrix}T_{Sds}-T_{SL}\\ T_{Dds}-T_{DL}\end{pmatrix}$$

Since the vibration suppressing control is feed-forward control and does not consider disturbances, the sum-mode wheel load-side torque $T_{SL}=0$ and the difference-mode wheel load-side torque $T_{DL}=0$ are obtained, and the following Math 10 holds.

[Math 10]

$$\begin{pmatrix}\omega_{SL}\\ \omega_{DL}\end{pmatrix}=\begin{pmatrix}\frac{1}{J_{SL}s+D_{SL}}&0\\ 0&\frac{1}{J_{DL}s+D_{DL}}\end{pmatrix}\begin{pmatrix}T_{Sds}\\ T_{Dds}\end{pmatrix}$$

In addition, since the dynamics of the driving side is represented by $P_M$ of the above Math 4, the equation of motion of the driving side of the above Math 7 is rewritten as follows.

[Math 11]

$$\begin{pmatrix}\omega_{Sds}\\ \omega_{Dds}\end{pmatrix}=\frac{P_M}{G^2}\begin{pmatrix}1&0\\ 0&\frac{1}{(2b+1)^2}\end{pmatrix}\begin{pmatrix}T_{Sin}-T_{Sds}\\ T_{Din}-T_{Dds}\end{pmatrix}=\frac{1}{G^2}\left(\frac{1}{J_Ms+D_M}\right)\begin{pmatrix}1&0\\ 0&\frac{1}{(2b+1)^2}\end{pmatrix}\begin{pmatrix}T_{Sin}-T_{Sds}\\ T_{Din}-T_{Dds}\end{pmatrix}$$

Furthermore, since the dynamics of the axles 4 is represented by PDS of the above Math 4, the equation of motion of the axles 4 of the above Math 8 is rewritten as follows.
[Math 12]

[Math 12]

$$\begin{pmatrix}T_{Sds}\\ T_{Dds}\end{pmatrix}=P_{DS}\begin{pmatrix}\omega_{Sds}-\omega_{SL}\\ \omega_{Dds}-\omega_{DL}\end{pmatrix}=\begin{pmatrix}D_s+\frac{K_s}{s}&0\\ 0&D_s+\frac{K_s}{s}\end{pmatrix}\begin{pmatrix}\omega_{Sds}-\omega_{SL}\\ \omega_{Dds}-\omega_{DL}\end{pmatrix}$$

The following equation is obtained by substituting Math 10 and Math 11 into $\omega_{Sds}$, $\omega_{Dds}$, $\omega_{SL}$, $\omega_{DL}$ in the above Math 12, and further rearranging Math 12 using the relationships $J_{SM}=G^2J_M$, $D_{SM}=G^2D_M$, $J_{DM}=(2b_1+1)^2G^2J_M$, and $D_{DM}=(2b_1+1)^2G^2D_M$. Thereby, the sum-mode axle torque $T_{Sds}$ and the difference-mode axle torque $T_{Dds}$ When the sum-mode driving-side torque $T_{Sin}$ and the difference-mode driving-side torque $T_{Din}$ are applied to the axles 4 are obtained.

[Math 13]

$$\begin{pmatrix}T_{Sds}/T_{Sin}\\ T_{Dds}/T_{Din}\end{pmatrix}=\begin{pmatrix}\dfrac{J_{SL}D_Ss^2+(D_{SL}D_S+J_{SL}K_S)s+D_{SL}K_S}{J_{SM}J_{SL}s^3+\{J_{SM}(D_{SL}+D_S)+J_{SL}(D_{SM}+D_S)\}s^2+\{D_{SM}D_{SL}+D_{SM}D_S+D_{SL}D_S+K_S(J_{SM}+J_{SL})\}s+K_S(D_{SM}+D_{SL})}\\ \dfrac{J_{DL}D_Ss^2+(D_{DL}D_S+J_{DL}K_S)s+D_{DL}K_S}{J_{DM}J_{DL}s^3+\{J_{DM}(D_{DL}+D_S)+J_{DL}(D_{DM}+D_S)\}s^2+\{D_{DM}D_{DL}+D_{DM}D_S+D_{DL}D_S+K_S(J_{DM}+J_{DL})\}s+K_S(D_{DM}+D_{DL})}\end{pmatrix}$$

The following equation is obtained by inverting the transfer function of the above Math 13, setting the requested torques calculated in, for example, the superordinate ECU to $T_{Sds\text{-}ref}$ and $T_{Dds\text{-}ref}$ and substituting the requested torques $T_{Sds\text{-}ref}$ and $T_{Dds\text{-}ref}$ for the axle torques $T_{Sds}$ and $T_{Dds}$ of Math 13.

[Math 14]

$$\begin{pmatrix}T_{Sin}/T_{Sds-ref}\\ T_{Din}/T_{Dds-ref}\end{pmatrix}=\begin{pmatrix}\dfrac{J_{SM}J_{SL}s^3+\{J_{SM}(D_{SL}+D_S)+J_{SL}(D_{SM}+D_S)\}s^2+\{D_{SM}D_{SL}+D_{SM}D_S+D_{SL}D_S+K_S(J_{SM}+J_{SL})\}s+K_S(D_{SM}+D_{SL})}{J_{SL}D_Ss^2+(D_{SL}D_S+J_{SL}K_S)s+D_{SL}K_S}\\ \dfrac{J_{DM}J_{DL}s^3+\{J_{DM}(D_{DL}+D_S)+J_{DL}(D_{DM}+D_S)\}s^2+\{D_{DM}D_{DL}+D_{DM}D_S+D_{DL}D_S+K_S(J_{DM}+J_{DL})\}s+K_S(D_{DM}+D_{DL})}{J_{DL}D_Ss^2+(D_{DL}D_S+J_{DL}K_S)s+D_{DL}K_S}\end{pmatrix}$$

Since the transfer function in the above Math 14 is not proper, the transfer function is formed into a proper form by means of a second-order low-pass filter and the following equation is obtained. This can calculate torques (i.e., the sum-mode instruction torque $T_{Sin}$ and the difference-mode instruction torque $T_{Din}$) to be provided to the motors 2 to obtain the requested sum- and difference-mode axle torques $T_{Sds\text{-}ref}$ and $T_{Dds\text{-}ref}$. That is, the following Math 15 is an example of a transfer function included in the sum model and the difference model.

[Math 15]

$$\begin{pmatrix} T_{Sin}/T_{Sds-ref} \\ T_{Din}/T_{Dds-ref} \end{pmatrix} = \begin{pmatrix} \dfrac{J_{SM}J_{SL}s^3 + \{J_{SM}(D_{SL}+D_S) + J_{SL}(D_{SM}+D_S)\}s^2 + \{D_{SM}D_{SL} + D_{SM}D_S + D_{SL}D_S + K_S(J_{SM}+J_{SL})\}s + K_S(D_{SM}+D_{SL})}{J_{SL}D_S s^2 + (D_{SL}D_S + J_{SL}K_S)s + D_{SL}K_S} \\ \dfrac{J_{DM}J_{DL}s^3 + \{J_{DM}(D_{DL}+D_S) + J_{DL}(D_{DM}+D_S)\}s^2 + \{D_{DM}D_{DL} + D_{DM}D_S + D_{DL}D_S + K_S(J_{DM}+J_{DL})\}s + K_S(D_{DM}+D_{DL})}{J_{DL}D_S s^2 + (D_{DL}D_S + J_{DL}K_S)s + D_{DL}K_S} \end{pmatrix} \frac{1}{(\tau s+1)^2}$$

Further, decomposing the parameters of the sum model and the difference model by the equation of the derived transfer function reveals that there are a parameter (vehicle body weight M) which appears only in the sum model and a parameter (yaw inertia $I_z$) which appears only in the difference model as shown in FIG. 10. These parameters M and $I_z$ are parameters which do not interfere with each other in the sum model and difference model and are hereinafter referred to as "non-interference parameters".

In the vehicle control device 10 of the present embodiment, the non-interference parameters M and $I_z$ are used as calibrating coefficients in an adaptation process of the vehicle 1. This means that calibrating and adapting of the vehicle body weight M serving as the non-interference parameter makes the sum model focusing on the running-straight state (translational motion) of the vehicle 1 possible not to affect the cornering state. Similarly, calibrating and adapting of the yaw inertia $I_z$ serving as the non-interference parameter makes the difference mode focusing on the cornering state (yaw motion) of the vehicle 1 possible not to affect the running-straight state.

4. Effect (1) The above vehicle control device 10 includes the calculator 11, the sum model, the difference model, and the controller 13. The calculator 11 calculates the equivalent sum value corresponding to the sum of the left requested torque and the right requested torque and the equivalent difference value corresponding to the difference between the left requested torque and the right requested torque. Further, the sum model is a model that models motion states of the left driving system and the right driving system while the vehicle 1 is running straight and is applied with the equivalent sum value. Further, the difference model is a model that models motion states of the left driving system and the right driving system while the vehicle 1 is cornering and is applied with the equivalent difference value.

Then, the controller 13 controls the left and right motors 2, using the sum-mode instruction torque obtained by applying the equivalent sum value to the sum model and the difference-mode instruction torque obtained by applying the equivalent difference value to the difference model. This configuration can suppress vibrations of the left and right axles 4 having a vibration characteristic different between the running-straight state and the cornering state without interfering with each other. In addition, by separating the sum model corresponding to the running-straight state and the difference model corresponding to the cornering state, and constructing these models independent of each other, the requirement for complex control on decoupling can be eliminated, so that the vehicle control device 10 can be designed more simply and the vibration suppression can be achieved with a simple configuration.

(2) In the above embodiment, both the sum model and the difference model can be constructed as two-inertia system models. This configuration makes it possible to construct models of the motion states (in particular, vibration suppression) of the left and right driving systems while the vehicle 1 is running straight and while the vehicle 1 is cornering with a simple configuration. In addition, on a vibration characteristic that is different between the running-straight state and the cornering state, control considering the respective viscoelasticity can be carried out. Accordingly, the controllability of the vehicle 1 can be enhanced, and a higher vibration-suppressing effect can be obtained.

(3) As shown in FIG. 6A, the above sum model can be expressed by the transfer function indicating the input/output characteristic of the two-inertia system including the driving-side inertia calculated based on the inertia of the left driving source and the right driving source, the spring damper designed with the stiffness and viscosity, and the load-side inertia calculated based on the body weight of the vehicle 1. As a result, the vibration while the vehicle 1 is running straight can be efficiently suppressed, considering the viscoelasticity, so that the controllability of the vehicle 1 can be enhanced.

(4) As shown in FIG. 6B, the above difference model can be expressed by the transfer function indicating the input/output characteristic of the two-inertia system including the driving-side inertia corresponding to the equivalent inertia when a left-right difference is generated which equivalent inertia is calculated based on the torque difference amplification ratio, the spring damper designed with the stiffness and viscosity, and the load-side inertia calculated based on the yaw inertia of the vehicle 1. As a result, the vibration while the vehicle 1 is cornering can be efficiently suppressed, considering the viscoelasticity, so that the controllability of the vehicle 1 can be enhanced.

(5) In the above embodiment, as shown in Math 15, the sum model includes the transfer function expressed by a ratio of the sum-mode driving-side torque $T_{Sin}$ to the equivalent sum value (e.g., sum-mode requested torque $T_{Sds-ref}$) and the difference model includes the transfer function expressed by a ratio of the difference-mode driving-side torque T Din to the equivalent difference value (e.g., difference-mode requested torque $T_{Dds-ref}$). By executing feed-forward vibration suppressing control using the models including these transfer functions, instruction torques that achieve requested outputs can be calculated without using sensor values and vibrations on the left and right axles 4 can be appropriately suppressed.

(6) Further, since the above vehicle control device 10 uses the non-interference parameters M and $I_z$ as the calibrating coefficients in the adaptation process, the adaptation in the running-straight state and the adaptation in the cornering state can be efficiently performed without interfering with each other.

5. Miscellaneous

The above embodiment is merely illustrative, and is not intended to exclude the application of various modifications and techniques not explicitly described in the present embodiment. Each configuration of the present embodiment can be variously modified and implemented without departing from the scope thereof. In addition, the configurations of the present embodiment can be selected and omitted as needed, or can be combined appropriately.

For example, in the above-described vehicle control device 10, in controlling the outputs of the left motor 2L and the right motor 2R, the controller 13 may consider a request of a driver of the vehicle 1 and an accelerating state of the vehicle 1. Examples of the request of the driver include a steering angle and an accelerator operation. Further, examples of the acceleration state include the longitudinal acceleration (front-rear G) and the lateral acceleration (lateral G). The controller 13 may consider either one of the request of the driver and the acceleration state or both. For example, the controller 13 can execute control considering the request (e.g., a steering angle) of the driver and an accelerating state (front-rear G, lateral G) by adding the parameters of the request and the state into the equations of the transfer functions included in the sum model and the difference mode.

The above embodiment uses the left-axle requested torque $T_{Lds\text{-}ref}$ and the right-axle requested torque $T_{Rds\text{-}ref}$ as the left requested torque and the right axle requested torque, respectively, but may alternatively use a requested torque to the left motor 2L and a requested torque to the right motor 2R as the left requested torque and the right requested torque, respectively.

The above embodiment describes the vehicle 1 that mounts thereon the pair of motors 2 serving as driving sources, but an internal combustion engine may be applied in place of the motors 2. The specific type of the driving source is not limited. The vehicle 1 that includes a vehicle driving device ($D_M$-AYC device) including the pair of motors 2 and the power distributing mechanism 3 is illustrated. However, the concept of the sum model and the difference model can be applied to any vehicle exemplified by a vehicle without the power distributing mechanism 3 or an in-wheel motor vehicle. A vehicle provided with at least a left driving system including a left axle and a left wheel to which motion power from the left driving source is transmitted and a right driving system including a right axle and a right wheel to which motion power from the right driving source is transmitted can undergo the control the same as the above embodiment and can obtain the same actions and effects as those of the above embodiment.

6. Appendix

In relation to the above embodiment and the modifications, the following appendices will now be disclosed.

[Appendix 1]

A vehicle control device that controls outputs of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel, the vehicle control device comprising:

a calculator that calculates an equivalent sum value corresponding to a sum of a left requested torque being a requested torque to the left driving system or the left driving source and a right requested torque being a requested torque to the right driving system or the right driving source and calculates an equivalent difference value corresponding to a difference between the left requested torque and the right requested torque;

a sum model that models motion states of the left driving system and the right driving system while the vehicle is running straight, the equivalent sum value being applied to the sum model;

a difference model that models motion states of the left driving system and the right driving system while the vehicle is cornering, the equivalent difference value being applied to the difference model; and a controller that controls the outputs of the left driving source and the right driving source, using a sum-mode instruction torque obtained by applying the equivalent sum value to the sum model and a difference-mode instruction torque obtained by applying the equivalent difference value to the difference model.

[Appendix 2]

The vehicle control device according to appendix 1, wherein the sum model and the difference model are both two-inertia system models.

[Appendix 3]

The vehicle control device according to appendix 1 or 2, wherein the sum model includes a transfer function indicating an input/output characteristic of a two-inertia system including driving-side inertia calculated based on inertia of the left driving source and inertia of the right driving source, a spring damper designed with a stiffness and a viscosity, and load-side inertia calculated based on a vehicle body weight of the vehicle.

[Appendix 4]

The vehicle control device according to any one of appendices 1 to 3, wherein the difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

[Appendix 5]

The vehicle control device according to any one of appendices 1 to 4, wherein the sum model includes a transfer function expressed by a ratio of a sum-mode driving-side torque to the equivalent sum value, the sum-mode driving-side torque being used for vibration suppressing control on the left driving source and the right driving source, and the difference model includes a transfer function expressed by a ratio of a difference-mode driving-side torque to the equivalent difference value, the difference-mode driving-side torque being used for the vibration suppressing control.

[Appendix 6]

The vehicle control device according to any one of appendices 1 to 5, wherein the controller considers a request of a driver of the vehicle or an accelerating state of the vehicle in the controlling of the outputs of the left driving source and the right driving source.

[Appendix 7]

The vehicle control device according to any one of appendices 1 to 6, wherein a transfer function of the difference model includes a parameter not interfering with a parameter included in a transfer function of the sum model, and the parameters are used as calibrating coefficients in an adaptation process of the vehicle.

[Appendix 8]

A vehicle control method for controlling outputs of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel, the vehicle control method comprising:

preparing a sum model that models motion states of the left driving system and the right driving system while the vehicle is running straight and a difference model that models motion states of the left driving system and the right driving system while the vehicle is cornering in advance;

calculating an equivalent sum value corresponding to a sum of a left requested torque being a requested torque to the left driving system or the left driving source and a right requested torque being a requested torque to the right driving system or the right driving source and calculating an equivalent difference value corresponding to a difference between the left requested torque and the right requested torque;

obtaining a sum-mode instruction torque by applying the equivalent sum value to the sum model and a difference-mode instruction torque by applying the equivalent difference value to the difference model; and controlling the outputs of the left driving source and the right driving source, using the sum-mode instruction torque and the difference-mode instruction torque.

[Appendix 9]

The vehicle control method according to appendix 8, wherein the sum model and the difference model are both two-inertia system models.

[Appendix 10]

The vehicle control method according to appendix 8 or 9, wherein the sum model includes a transfer function indicating an input/output characteristic of a two-inertia system including driving-side inertia calculated based on inertia of the left driving source and inertia of the right driving source, a spring damper designed with a stiffness and a viscosity, and load-side inertia calculated based on a vehicle body weight of the vehicle.

[Appendix 11]

The vehicle control method according to any one of appendices 8 to 10, wherein the difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

[Appendix 12]

The vehicle control method according to any one of appendices 8 to 11, wherein the sum model includes a transfer function expressed by a ratio of a sum-mode driving-side torque to the equivalent sum value, the sum-mode driving-side torque being used for vibration suppressing control on the left driving source and the right driving source, and the difference model includes a transfer function expressed by a ratio of a difference-mode driving-side torque to the equivalent difference value, the difference-mode driving-side torque being used for the vibration suppressing control.

[Appendix 13]

The vehicle control method according to any one of appendices 8 to 12, further comprising considering a request of a driver of the vehicle or an accelerating state of the vehicle in the controlling of the outputs of the left driving source and the right driving source.

INDUSTRIAL APPLICABILITY

The present embodiment is applicable to manufacturing industries of a vehicle control device and also applicable to manufacturing industries of a vehicle provided with the vehicle control device.

DESCRIPTION OF REFERENCE SIGN

1 Vehicle
2 Motor (Driving Source)
3 Power Distributing Mechanism
4 Axle
5 Left and Right Wheels
6 Invertor
7 Battey
10 Vehicle Control Device
11 Calculator
12 Storing Unit
13 Controller
14 Accelerator Position Sensor
15 Brake Sensor
16 Steering Sensor
17 Resolver
18 Wheel Speed Sensor

The invention claimed is:

1. A vehicle control device that controls outputs of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel, the vehicle control device comprising:

a calculator that calculates an equivalent sum value corresponding to a sum of a left requested torque being a requested torque to the left driving system or the left driving source and a right requested torque being a requested torque to the right driving system or the right driving source and calculates an equivalent difference value corresponding to a difference between the left requested torque and the right requested torque;

a sum model that models motion states of the left driving system and the right driving system while the vehicle is running straight, the equivalent sum value being applied to the sum model;

a difference model that models motion states of the left driving system and the right driving system while the vehicle is cornering, the equivalent difference value being applied to the difference model; and a controller that controls the outputs of the left driving source and the right driving source, using a sum-mode instruction torque obtained by applying the equivalent sum value to the sum model and a difference-mode instruction torque obtained by applying the equivalent difference value to the difference model.

2. The vehicle control device according to claim 1, wherein the sum model and the difference model are both two-inertia system models.

3. The vehicle control device according to claim 2, wherein the sum model includes a transfer function indicating an input/output characteristic of a two-inertia system including driving-side inertia calculated based on inertia of the left driving source and inertia of the right driving source, a spring damper designed with a stiffness and a viscosity, and load-side inertia calculated based on a vehicle body weight of the vehicle.

4. The vehicle control device according to claim 2, wherein the difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

5. The vehicle control device according to claim 3, wherein the difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

6. The vehicle control device according to claim 1, wherein the controller considers a request of a driver of the vehicle or an accelerating state of the vehicle in the controlling of the outputs of the left driving source and the right driving source.

7. The vehicle control device according to claim 3, wherein the transfer function of the sum model includes a parameter not interfering with a parameter included in a transfer function of the difference model, and the parameters are used as calibrating coefficients in an adaptation process of the vehicle.

8. The vehicle control device according to claim 4, wherein the transfer function of the difference model includes a parameter not interfering with a parameter included in a transfer function of the sum model, and the parameters are used as calibrating coefficients in an adaptation process of the vehicle.

9. The vehicle control device according to claim 5, wherein the transfer function of the difference model includes a parameter not interfering with a parameter included in a transfer function of the sum model, and the parameters are used as calibrating coefficients in an adaptation process of the vehicle.

10. A vehicle control method for controlling outputs of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel, the vehicle control method comprising:

preparing a sum model that models motion states of the left driving system and the right driving system while the vehicle is running straight and a difference model that models motion states of the left driving system and the right driving system while the vehicle is cornering in advance;

calculating an equivalent sum value corresponding to a sum of a left requested torque being a requested torque to the left driving system or the left driving source and a right requested torque being a requested torque to the right driving system or the right driving source and calculating an equivalent difference value corresponding to a difference between the left requested torque and the right requested torque;

obtaining a sum-mode instruction torque by applying the equivalent sum value to the sum model and a difference-mode instruction torque by applying the equivalent difference value to the difference model; and controlling the outputs of the left driving source and the right driving source, using the sum-mode instruction torque and the difference-mode instruction torque.

* * * * *